United States Patent
Liu

(10) Patent No.: US 11,558,919 B2
(45) Date of Patent: Jan. 17, 2023

(54) COMMUNICATION METHOD, ACCESS NETWORK DEVICE AND TERMINAL DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/606,568

(22) PCT Filed: Apr. 20, 2017

(86) PCT No.: PCT/CN2017/081277
§ 371 (c)(1),
(2) Date: Oct. 18, 2019

(87) PCT Pub. No.: WO2018/191917
PCT Pub. Date: Oct. 25, 2018

(65) Prior Publication Data
US 2020/0374965 A1    Nov. 26, 2020

(51) Int. Cl.
*H04W 76/27* (2018.01)
*H04W 76/15* (2018.01)
*H04W 72/12* (2009.01)
*H04L 1/00* (2006.01)

(52) U.S. Cl.
CPC .......... *H04W 76/27* (2018.02); *H04L 1/0026* (2013.01); *H04W 72/1226* (2013.01); *H04W 72/1284* (2013.01); *H04W 76/15* (2018.02)

(58) Field of Classification Search
CPC . H04W 76/27; H04W 72/1244; H04W 76/15; H04W 72/1226; H04L 1/0026
See application file for complete search history.

(56) References Cited

U.S. PATENT DOCUMENTS

| 8,538,430 | B1 | 9/2013 | Filiatrault et al. |
| 2014/0355536 | A1 | 12/2014 | Muley et al. |
| 2016/0029235 | A1* | 1/2016 | Kim ..................... H04W 24/08 370/252 |

(Continued)

FOREIGN PATENT DOCUMENTS

| CN | 103139911 | 6/2013 |
| CN | 104284345 | 1/2015 |

(Continued)

OTHER PUBLICATIONS

FSIP, Office Action for RU Application No. 2019136682-07, dated May 29, 2020.

(Continued)

*Primary Examiner* — Muthuswamy G Manoharan
(74) *Attorney, Agent, or Firm* — Hodgson Russ LLP

(57) ABSTRACT

A communication method includes: receiving, by a first primary access network device, a first message sent by a terminal device in a specific state when there is uplink data to be transmitted; and controlling, by the first primary access network device, a secondary connection between the terminal device and the secondary access network device according to the first message.

20 Claims, 5 Drawing Sheets

(56) References Cited

U.S. PATENT DOCUMENTS

| | | | |
|---|---|---|---|
| 2016/0044744 A1 | 2/2016 | Lee et al. | |
| 2018/0110082 A1* | 4/2018 | Saily | H04W 76/15 |
| 2018/0324652 A1* | 11/2018 | Ryu | H04W 36/12 |
| 2019/0191348 A1* | 6/2019 | Futaki | H04W 36/14 |

FOREIGN PATENT DOCUMENTS

| | | |
|---|---|---|
| CN | 105940651 | 9/2016 |
| CN | 105981466 | 9/2016 |
| EP | 2892282 | 7/2015 |
| JP | 2016054537 | 4/2016 |
| JP | 2020511900 | 4/2020 |
| KR | 20150109174 | 10/2015 |
| KR | 20160108479 | 9/2016 |
| RU | 2012122624 | 2/2014 |
| RU | 2544848 | 3/2015 |
| WO | 2012126388 | 9/2012 |
| WO | 2013075602 | 5/2013 |
| WO | 2016065591 | 5/2016 |
| WO | 2016138937 | 9/2016 |
| WO | 2018174791 | 9/2018 |

OTHER PUBLICATIONS

SIPO, First Chinese Office Action for CN 201780089740.9, dated Sep. 28, 2020.

CIPO, First Canadian Office Action for CA 3060406, dated Nov. 25, 2020.

National Institute of Industrial Property, Chile, First Chilean Office Action for CL 201903001, dated Nov. 27, 2020.

3GPP, "TSG RAN; Evolved Universal Terrestrial Radio Access Network (E-UTRAN); S1 Application Protocol (S1AP)", 3GPP TS 36.413, vol. 13, Issue 1, p. 1-314, Dec. 2015.

3GPP, "TSG RAN; Evolved Universal Terrestrial Radio Access Network (E-UTRAN); X2 Application Protocol (X2AP)", 3GPP TS 36.423, vol. 13, Issue 2, p. 1-230, Dec. 2015.

ERICSSON, "Suspend/resume in LTE-NR interworking scenarios," 3GPP TSG-RAN WG2 #97bis, R2-1702704, Apr. 2017, 4 pages.

Nokia Corporation et al., "C-plane alternatives for dual-connectivity," 3GPP TSG-RAN WG2 Meeting #81bis, R2-131108, Apr. 2013, 3 pages.

Nokia et al., "Considerations on fast access inter-site small cells in NR," 3GPP TSG-RAN NR ad hoc, R2-1700744, Feb. 2017, 8 pages.

SIPO, Second Office Action for CN Application No. 201780089740.9, dated Apr. 13, 2021.

IPI, Office Action for IN Application No. 201917042815, dated Mar. 30, 2021.

JPO, Office Action for JP Application No. 2019-557456, dated Mar. 30, 2021.

KIPO, Office Action for KR Application No. 10-2019-7032342, dated Mar. 31, 2021.

IPOS, Office Action for SG Application No. 11201909799T, dated Mar. 17, 2021.

KIPO, Notice of Allowance for KR Application No. 10-2019-7032342, dated Nov. 29, 2021.

KIPO, Notice of Final Rejection for KR Application No. 10-2019-7032342, dated Oct. 22, 2021.

ILPO, Office Action for IL Application No. 270054, dated Jun. 9, 2022.

IPA, Office Action for AU Application No. 2017410366, dated Mar. 21, 2022.

ISDEC, Office Action for CA Application No. 3060406, dated Jun. 21, 2022.

WIPO, ISR for PCT/CN2017/081277, dated Nov. 17, 2017.

"3rd Generation Partnership Project; Technical Specification Group Radio Access Network; Evolved Universal Terrestrial Radio Access Network (E-UTRAN); Architecture Description (Release 14)," Draft 3GPP TS 36.401 v14.0.0, Mar. 2017, 21 pages.

EPO, Office Action for EP Application No. 17906488.6, dated Mar. 5, 2020.

CNIPA, Decision of Rejection for CN Application No. 201780089740.9, dated Aug. 31, 2021.

ISDEC, Office Action for CA Application No. 3060406, dated Aug. 25, 2021.

JPO, Decision of Refusal for JP Application No. 2019-557456, dated Jul. 16, 2021.

EPO, Communication for EP Application No. 17906488.6, dated Oct. 7, 2021.

* cited by examiner

COMMUNICATION METHOD, ACCESS NETWORK DEVICE AND TERMINAL DEVICE

CROSS-REFERENCE TO RELATED APPLICATION

This application is a U.S. national phase application of International Application No. PCT/CN2017/081277, filed Apr. 20, 2017, the entire disclosure of which is incorporated herein by reference.

TECHNICAL FIELD

The present application relates to the field of communication, and more particularly, to a communication method, an access network device and a terminal device.

BACKGROUND

In the deployment of a non-standalone network, a terminal device can receive or transmit data simultaneously through a Long Term Evolution (LTE) network and a New Radio (NR) network, which can be called a multiple (dual) connection technology.

Multiple (dual) connections of the terminal device include one primary connection and one or more secondary connections. The primary connection is a network connection between the terminal device and a primary access network device and the secondary connection is a network connection between the terminal device and a secondary access network device. For example, in the deployment of a LTE+ NR cell, the primary access network device may be a network device in a LTE network and the secondary access network device may be a network device in an NR network. A control plane data of the terminal device is transmitted through the primary connection and a user plane data of the terminal device can be transmitted through the primary connection and the secondary connection simultaneously to improve the throughput of the user plane data; or the user plane data can also be transmitted only through the secondary connection, to reduce the load of the primary access network device.

In a LTE system, a suspend state and a light connection state are introduced and in an NR system, a non-activated state is introduced. When the terminal device has no data to be transmitted, the network device transitions the terminal device to the states. The terminal device keeps a Radio Resource Control (RRC) connection with the network device under the states, but it does not transmit any data, or can only transmit a smaller amount of data. When the terminal device has uplink data to be transmitted, the terminal device requests for being transitioned to a state in which normal data transmission can be performed, so as to transmit the data.

SUMMARY

Embodiments of the present application provide a communication method, an access network device and a terminal device, which can control a secondary connection between the terminal device and a secondary access network device.

In a first aspect, there is provided communication method, including:

receiving, by a first primary access network device, a first message sent by a terminal device in a specific state when there is uplink data to be transmitted; and controlling, by the first primary access network device, a secondary connection between the terminal device and a secondary access network device according to the first message.

It should be noted that the specific state may be regarded as a state in which no data transmission is enabled between the terminal device and the access network device or only a small amount of data transmission is enabled between the terminal device and the access network device. For example, the specific state may be a suspend state, a light connection state, or a non-activated state.

Optionally, the first primary access network device may control the secondary connection between the terminal device and the secondary access network device according to contents contained in the first message. For example, the first message includes link quality information between the terminal device and one or more secondary access network devices. The first primary access network device may, according to the link quality information, select all or part of one or more secondary connections between the terminal device and one or more secondary access network devices for the continuous transmission of the uplink data of the terminal device, or it may release all or part of the secondary connections. Alternatively, the first primary access network device may also establish a secondary connection between the terminal device and the other secondary access network device for the transmitting of the uplink data of the terminal device, which is not limited by the embodiment of the present application.

In combination with the first aspect, in some implementation manners of the first aspect, the specific state is a suspend state or a non-activated state.

In combination with the first aspect, in some implementation manners of the first aspect, the first message is a radio resource control RRC message.

In combination with the first aspect, in some implementation manners of the first aspect, the first message is an RRC message which requests for switching the terminal device from a first state to a second state, or an RRC message which indicates that the terminal device has been switched from the first state to the second state.

For example, the first RRC message may be a first piece of RRC message or a third piece of RRC message used by the terminal device for state switching. Specifically, the first message may include an RRC connection request message or an RRC connection setup complete message.

Optionally, the first message may also be another message used for communication between the terminal device and the access network device, for example, a physical layer message or a Media Access Control (MAC) layer message, the embodiment of the present application does not impose any limitation on this.

In combination with the first aspect, in some implementation manners of the first aspect, before the receiving, by a first primary access network device, a first message sent by a terminal device in a specific state when there is uplink data to be transmitted, if a second primary access network device to which the terminal device is connected before it enters the specific state is the same as the first primary access network device, the method further includes:

suspending the secondary connection between the terminal device and the secondary access network device and transitioning the terminal device to the specific state by the first primary access network device.

In combination with the first aspect, in some implementation manners of the first aspect, the controlling, by the first primary access network device, a secondary connection between the terminal device and a secondary access network device according to the first message includes:

if the first message includes link quality information of the secondary access network, controlling, by the first primary access network device, the secondary connection between the terminal device and the secondary access network device according to the link quality information of the secondary access network.

In an embodiment of the present application, the link quality information of the secondary access network may include link quality information of a secondary access network to which the terminal device is connected before it enters the non-activated state, or link quality information of the secondary access networks around the first primary access network device. The first primary access network device may determine whether to resume the use of the secondary connection in the suspend state or release the secondary connection in the suspend state according to the link quality information of the secondary access networks. Alternatively, the first primary access network device may also select a secondary access network that enables data transmission of the terminal device according to the link quality information of the secondary access networks around the first primary access network device, to establish a new secondary connection with the terminal device.

Alternatively, the terminal device may determine, according to the detected link quality information of the secondary access network, whether the secondary access network is available or whether a link quality of the secondary access network meets a preset condition, in this case, the link quality information of the secondary access network included in the first message is information used by the terminal device to determine whether the secondary access network is available or whether the link quality of the secondary access network meets the preset condition. Therefore, the link quality information of the secondary access network may be interpreted as indication information which indicates whether the secondary access network is available or whether the link quality of the secondary access network meets the preset condition. In this case, the link quality information of the secondary access network may be 1-bit indication information which indicates whether the secondary access network is available or whether the link quality of the secondary access network satisfies the preset condition.

Optionally, the terminal device may also determine at least one secondary access network according to the link quality information of the detected secondary access networks around the first primary access network. Therefore, the first message includes information on the at least one secondary access network which indicates that the terminal device proposes or intends to establish the secondary connection. According to the first information, the first primary access network device may establish secondary connections between the terminal device and some or all of the at least one secondary access network.

In combination with the first aspect, in some implementation manners of the first aspect, the controlling, by the first primary access network device, the secondary connection between the terminal device and the secondary access network device according to the link quality information of the secondary access network includes:

if the link quality information of the secondary access network indicates that the secondary access network is available or a link quality of the secondary access network meets a preset condition, controlling, by the first primary access network device, to restore the secondary connection between the terminal device and the secondary access network device; or if the link quality information of the secondary access network indicates that the secondary access network is unavailable or the link quality of the secondary access network does not meet a preset condition, controlling, by the first primary access network device, to release the secondary connection between the terminal device and the secondary access network device.

In an embodiment of the present application, the secondary access network is available means that the link quality of the secondary access network is greater than a preset link quality threshold, or a quality of service (QoS) of the secondary access network satisfies data transmission, the secondary access network device is not in a congested state. The link quality of the secondary access network meeting the preset condition may include that the link quality of the secondary access network is greater than a preset link quality threshold, or the QoS of the secondary access network satisfies the data transmission and the secondary access network device is not in the congested state, the embodiment of the present application does not impose any limitation on this.

Accordingly, the secondary access network is not available means that the link quality of the secondary access network is less than the preset link quality threshold, or the QoS of the secondary access network is not enough for data transmission or the secondary access network device is in the congested state. The link quality of the secondary access network failing to meet the preset condition means that the link quality of the secondary access network is less than the preset link quality threshold, or the QoS of the secondary access network is not good enough for data transmission and the secondary access network device is in the congested state, the embodiment of the present application does not impose any limitation on this.

In combination with the first aspect, in some implementation manners of the first aspect, the controlling, by the first primary access network device, the secondary connection between the terminal device and the secondary access network device according to the link quality information of the secondary access network includes:

if the link quality information of the secondary access network is indicative of a link quality value of the secondary access network, controlling, by the first primary access network device, the secondary connection between the terminal device and the secondary access network device according to the link quality value of the secondary access network.

In combination with the first aspect, in some implementation manners of the first aspect, the controlling, by the first primary access network device, the secondary connection between the terminal device and the secondary access network device according to the link quality value of the secondary access network includes:

if the link quality value of the secondary access network is not less than a pre-configured link quality threshold, controlling, by the first primary access network device, to restore the secondary connection between the terminal device and the secondary access network device; or if the link quality value of the secondary access network is less than the pre-configured link quality threshold, controlling, by the first primary access network device, to release the secondary connection between the terminal device and the secondary access network device.

In combination with the first aspect, in some implementation manners of the first aspect, the controlling, by the first primary access network device, the secondary connection between the terminal device and the secondary access network device according to the link quality information of the secondary access network includes:

if the first message does not include the link quality information of the secondary access network, controlling, by the first primary access network device, to release the secondary connection between the terminal device and the secondary access network device.

In combination with the first aspect, in some implementation manners of the first aspect, the first message includes first indication information which indicates that the terminal device proposes to restore or release the secondary connection; and the controlling, by the first primary access network device, a secondary connection between the terminal device and a secondary access network device according to the first message includes:

controlling, by the first primary access network device, the secondary connection between the terminal device and the secondary access network device according to the first indication information in the first message.

In combination with the first aspect, in some implementation manners of the first aspect, the controlling, by the first primary access network device, the secondary connection between the terminal device and the secondary access network device according to the first indication information in the first message includes:

if the first indication information indicates that the terminal device proposes to restore the secondary connection, controlling, by the first primary access network device, to restore the secondary connection between the terminal device and the secondary access network device; or if the first indication information indicates that the terminal device proposes to release the secondary connection, controlling, by the first primary access network device to release the secondary connection between the terminal device and the secondary access network device.

In combination with the first aspect, in some implementation manners of the first aspect, the controlling, by the first primary access network device, to restore the secondary connection between the terminal device and the secondary access network device includes:

sending, by the first primary access network device, to the secondary access network device, a second message, which requests the secondary access network device to restore the secondary connection; and receiving, by the first primary access network device, a response message of the second message sent by the secondary access network device, which indicates that the secondary access network device has restored the secondary connection.

In combination with the first aspect, in some implementation manners of the first aspect, after the first primary access network device receives the response message of the second message sent by the secondary access network device, the method further includes:

sending, by the first primary access network device, to the terminal device, a third message, which notifies the terminal device to restore related configuration of the secondary connection.

In combination with the first aspect, in some implementation manners of the first aspect, the third message is an RRC message.

In combination with the first aspect, in some implementation manners of the first aspect, the controlling, by the first primary access network device, to release the secondary connection between the terminal device and the secondary access network device includes:

sending, by the first primary access network device, to the secondary access network device, a fourth message, which requests the secondary access network device to release the secondary connection; and receiving, by the first primary access network device, a response message of the fourth message sent by the secondary access network device, which indicates that the secondary access network device has released the secondary connection.

In combination with the first aspect, in some implementation manners of the first aspect, after the receiving, by the first primary access network device, a response message of the fourth message sent by the secondary access network device, the method further includes:

sending, by the first primary access network device, to the terminal device, a fifth message, which notifies the terminal device that the secondary access network device has released the secondary connection.

In combination with the first aspect, in some implementation manners of the first aspect, the fifth message includes second indication information, which instructs the terminal device to release configuration information related to the secondary connection.

In combination with the first aspect, in some implementation manners of the first aspect, the fifth message is an RRC message.

In combination with the first aspect, in some implementation manners of the first aspect, if the second primary access network device to which the terminal device is connected before it enters the specific state is different from the first primary access network device, the method further includes:

obtaining, by the first primary access network device, the configuration information of the secondary connection from the second primary access network device, the configuration information of the secondary connection being used by the first primary access network device to control the secondary connection according to the configuration information of the secondary connection.

In combination with the first aspect, in some implementation manners of the first aspect, the obtaining, by the first primary access network device, the configuration information of the secondary connection from the second primary access network device includes:

sending, by the first primary access network device, to the second primary access network device, a sixth message, which requests for obtaining context information of the terminal device in the second primary access network; and receiving, by the first primary access network device, a response message of the sixth message sent by the second primary access network device, which includes the configuration information of the secondary connection.

In a second aspect, there is provided a communication method, including: determining, by a terminal device in a specific state, that there is uplink data to be transmitted; and sending, by the terminal device, to a first primary access network device, a first message, which is used by the first primary access network device to control a secondary connection between the terminal device and the secondary access network device.

In combination with the second aspect, in some implementation manners of the second aspect, the specific state is a suspend state or a non-activated state.

In combination with the second aspect, in some implementation manners of the second aspect, the first message is a radio resource control RRC message.

In combination with the second aspect, in some implementation manners of the second aspect, the first message is a first RRC message which requests for switching the terminal device from a first state to a second state, or a second RRC message which indicates that the terminal device has been switched from the first state to the second state.

In combination with the second aspect, in some implementation manners of the second aspect, before the sending, by the terminal device, to a first primary access network device, a first message, the method further includes:

detecting, by the terminal device, a link quality of a secondary access network;

the sending, by the terminal device, to a first primary access network device, a first message includes:

sending, by the terminal device, the first message including link quality information of the secondary access network to the first primary access network device.

In combination with the second aspect, in some implementation manners of the second aspect, the link quality information of the secondary access network indicates that the secondary access network is available or a link quality of the secondary access network meets a preset condition; or the link quality information of the secondary access network indicates that the secondary access network is unavailable or the link quality of the secondary access network does not meet a preset condition; or the link quality information of the secondary access network is indicative of a link quality value of the secondary access network.

In combination with the second aspect, in some implementation manners of the second aspect, the first message includes first indication information, which indicates that the terminal device proposes to restore or release the secondary connection.

In combination with the second aspect, in some implementation manners of the second aspect, the method further includes:

receiving, by the terminal device, a second message sent by the first primary access network device, which notifies the terminal device to restore configuration information related to the secondary connection.

In combination with the second aspect, in some implementation manners of the second aspect, the method further includes:

if the secondary connection is restored, transmitting, by the terminal device, the uplink data through the secondary connection, or through the secondary connection and a primary connection between the terminal device and the first primary access network device.

In combination with the second aspect, in some implementation manners of the second aspect, the method further includes:

if the secondary connection is released, transmitting, by the terminal device, the uplink data through a primary connection between the terminal device and the first primary access network device, or transmitting, by the terminal device, the uplink data through other secondary connections, or transmitting the uplink data through the primary connection and the other secondary connections.

In combination with the second aspect, in some implementation manners of the second aspect, the second message is an RRC message.

In combination with the second aspect, in some implementation manners of the second aspect, the method further includes:

receiving, by the terminal device, a third message sent by the first primary access network device, which notifies the terminal device that the secondary access network device has released the secondary connection.

In combination with the second aspect, in some implementation manners of the second aspect, the third message includes second indication information, which instructs the terminal device to release configuration information related to the secondary connection.

In combination with the second aspect, in some implementation manners of the second aspect, the third message is an RRC message.

In combination with the second aspect, in some implementation manners of the second aspect, the method further includes:

receiving, by the terminal device, a fourth message sent by the second access network device, which is a primary access network device to which the terminal device is connected before it enters the specific state; and suspending, by the terminal device, the secondary connection between the terminal device and the secondary access network device according to the fourth message.

In combination with the second aspect, in some implementation manners of the second aspect, the fourth message is an RRC message.

In a third aspect, there is provided an access network device, including a unit for performing the method in the first aspect or its various implementation manners.

In a fourth aspect, there is provided a terminal device, including a unit for performing the method in the second aspect or its various implementation manners.

In a fifth aspect, there is provided an access network device, including a memory for storing programs, a transceiver and a processor which is configured to execute the programs which, when executed, cause the processor to perform the method in the first aspect by means of the transceiver.

In a sixth aspect, there is provided a terminal device, including a memory for storing programs, a transceiver and a processor which is configured to execute the programs which, when executed, cause the processor to perform the method in the second aspect by means of the transceiver.

In a seventh aspect, there is provided a computer readable medium storing a program code for execution by an access network device, the program code including instructions for performing the method in the first aspect.

In an eighth aspect, there is provided a computer readable medium storing a program code for execution by a terminal device, the program code including instructions for performing the method in the second aspect.

DETAILED DESCRIPTION

The technical solutions in the embodiments of the present disclosure will be described below with reference to the accompanying drawings.

It should be understood that the technical solutions in the embodiments of the present application may be applied to various communication systems, for example, Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, or future 5G system.

It should also be understood that in an embodiment of the present application, the terminal device may refer to User Equipment (UE), a terminal device, a Mobile Station (MS), a Mobile Terminal (MT), or a terminal device in a future 5G network, or the like. The terminal device can communicate with one or more core networks via a Radio Access Network (RAN). For example, the terminal can be a mobile phone (or "cellular" phone) or a computer having a mobile terminal or the like. For example, the terminal can also be a portable, pocket-sized, handheld, computer-integrated or in-vehicle mobile device, which can exchange voice and/or data with a wireless access network.

In an embodiment of the present application, the access network device may be Base Transceiver Station (BTS) in Global System of Mobile communication (GSM) or Code Division Multiple Access (CDMA), or NodeB (NB) in Wideband Code Division Multiple Access (WCDMA), or Evolutional NodeB (eNB or eNodeB) in LTE, or a relay station, an access point, an in-vehicle device, a wearable device, an access network device in a future 5G network.

In an embodiment of the present application, a core network device may be a Mobility Management Entity (MME), or a Serving Gateway (S-GW) or a PDN Gateway (P-GW), which is not limited by the present application.

Figure 1:
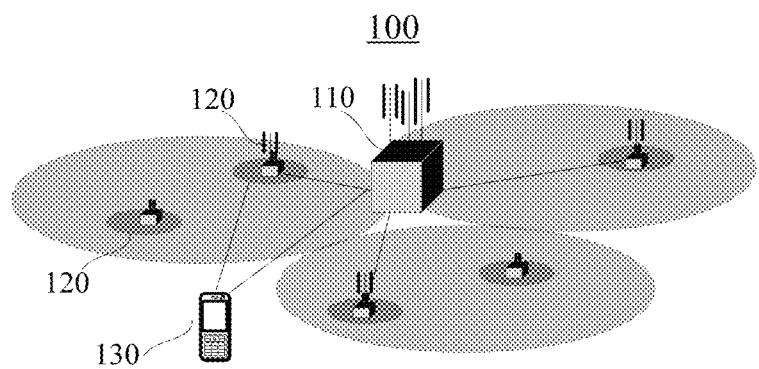
FIG. 1 is a schematic diagram of a wireless communication system according to an embodiment of the present application.

FIG. 1 is a schematic diagram illustrating an application scene according to an embodiment of the present application. Network devices around a terminal device include a first primary access network device 110 and at least one secondary access network device 120. The first primary access network device 110 may be an LTE network device and the secondary access network device 120 may be an NR network device. A terminal device 130 may establish a connection with a network at the same time through the first primary access network device 110 and the secondary access network device 120. A connection between the terminal device 130 and the first primary access network device 110 is called a primary connection and a connection between the terminal device 130 and the secondary access network device 120 is called a secondary connection.

In an embodiment of the present application, a control plane data of the terminal device 130 may be transmitted through the primary connection and a user plane data of the terminal device may be transmitted simultaneously through the primary connection and the secondary connection or through the secondary connection only.

In an embodiment of the present application, the first primary access network device and a second access network device may be, for example, Macrocell and the secondary access network device may be, for example, Microcell, Picocell, or Femtocell, but the embodiment of the present application is not limited thereto.

For example, the first primary access network device may be an LTE access network device and the secondary access network device is an NR access network device, it should be understood that the embodiment of the present application is not limited thereto. The primary access network device may also be a GSM network device, a CDMA network device and the secondary access network device may also be a GSM network device, a CDMA network device, which is not limited in the embodiment of the present application.

Figure 2:
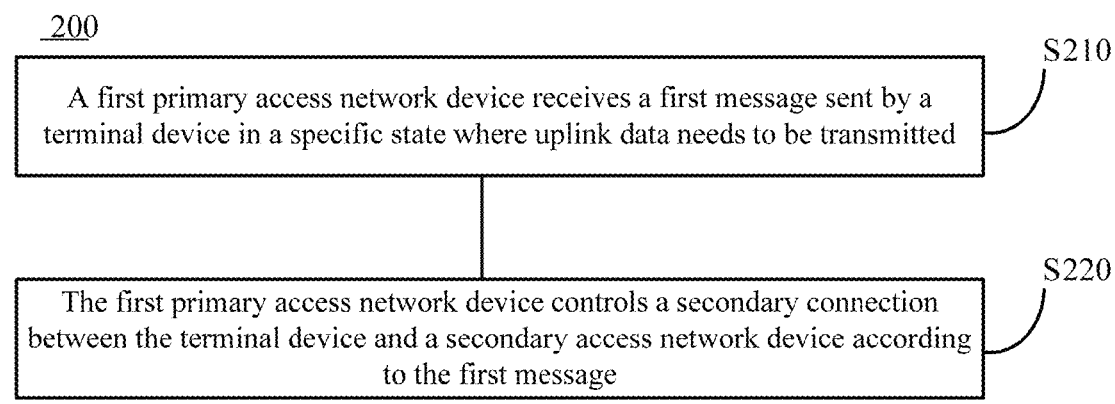
FIG. 2 is a schematic flowchart of a communication method according to an embodiment of the present application.

FIG. 2 is a schematic flowchart showing a communication method 200 according to an embodiment of the present application. An execution body of the method 200 may be, for example, the first primary access network device 110 shown in FIG. 1, such as eNB in LTE. The method 200 includes the following steps.

In step S210, the first primary access network device receives a first message sent by a terminal device in a specific state when there is uplink data to be transmitted.

It should be noted that the terminal device is currently in a first primary access network and the first primary access network device is an access network device of the first primary access network. The terminal device is currently in the specific state which refers to a state in which no data transmission is enabled between the terminal device and the access network device or only a small amount of data transmission is enabled between the terminal device and the access network device. For example, the specific state may be a suspend state, a light connection state, or a non-activated state. When determining that the uplink data needs to be transmitted, the terminal device in the specific state sends the first message to the first primary access network device in the first primary access network. The first message is used to request for the transitioning of the terminal device from the specific state to a state in which normal data transmission is enabled, for example, an activated state or an RRC connection state, so that the terminal device can transmit the uplink data.

It should be understood that in the embodiment of the present application, the specific state includes, but not limited to, the suspend state, the light connection state, or the non-activated state and it is also used to describe a state in which the terminal device cannot transmit any data or can only transmit a small amount of data. Further, when the terminal device needs to perform normal data transmission, it needs to transition to a state in which normal data transmission can be performed, for example, the activated state or the RRC connection state. In the following embodiment, the non-activated state is taken as an example to describe the state in which the terminal device cannot perform normal data transmission and the activated state is taken as an example to describe the state in which the terminal device can perform normal data transmission, but no limitation should be imposed on the embodiment of the present application.

If network in which the terminal device enters the non-activated state is a second primary access network, optionally, the first and second primary access networks may be the same or different networks. For example, if the terminal device is moved to the second primary access network after entering the non-activated state and it determines that there is uplink data to be sent in the second primary access network, then the first and second primary access networks are different networks. Alternatively, if the terminal device that is in the non-activated state determines that there is uplink data to be sent when it is still in the first primary access network, then the first and second primary access networks are the same network.

That is to say, if the access network in which the terminal device entering the specific state determines that there is data needing to be transmitted is the same as the access network in which the terminal device before its entering the specific state is located, the first and second primary access network devices are the same access network devices, namely, an access network node before and after the state switching is not changed; otherwise, the first and second primary access network devices are different access network devices, namely, the access network nodes before and after the state switching are changed.

As above noted, when there is no data needing to be transmitted by the terminal device, the second primary access network device transitions the terminal device to the non-activated state and suspends secondary connection between the terminal device and the secondary access network device. When determining that there is uplink data needing to be transmitted, the terminal device in the non-activated state may send, to the first primary access network device (as described above, if the terminal device is not moved to a new access network, the first and second primary access network devices are the same, otherwise, they are different), the first message which may be used to request for the transitioning of the terminal device to the activated-state, so as to transmit the uplink data.

Optionally, the first message may be an RRC message. For example, the first message is a first RRC message which requests the terminal device to be switched from a first state to a second state or a second RRC message which indicates that the terminal device has been transitioned from the first state to the second state.

For example, the first RRC message may be a first piece of RRC message or a third piece of RRC message used by the terminal device for state switching. Specifically, the first message may include an RRC connection request message or an RRC connection setup complete message.

Optionally, the first message may also be another message used for communication between the terminal device and the access network device, for example, a physical layer message or a Media Access Control (MAC) layer message, the embodiment of the present application does not impose any limitation on this.

In step S220, the first primary access network device controls the secondary connection between the terminal device and the secondary access network device according to the first message.

It should be understood that in the embodiment of the present application, when the terminal device is in the non-activated state, the secondary connection between the terminal device and the secondary access network device is in the suspend state. That is to say, no data transmission is enabled between the terminal device and the secondary access network device via the secondary connection. According to the first message sent by the terminal device, the first primary access network device may control the terminal device to continue to use the secondary connection to perform data transmission or release the secondary connection, or re-establish another secondary connection to transmit the uplink data.

It should be noted that in an embodiment of the present application, the secondary connection between the terminal device and the secondary access network device may include one or more secondary connections. And the secondary connection between the terminal device and the secondary access network device mainly refers to a secondary connection for data transmission between the terminal device and the secondary access network device prior to entering the non-activated state.

Optionally, the first primary access network device may control the secondary connection between the terminal device and the secondary access network device according to contents contained in the first message. For example, the first message includes link quality information between the terminal device and one or more secondary access network devices. The first primary access network device may, according to the link quality information, select all or part of the one or more secondary connections between the terminal device and one or more secondary access network devices for the continuous transmission of the uplink data of the terminal device, or it may release all or part of the secondary connections. Alternatively, the first primary access network device may also establish a secondary connection between the terminal device and the other secondary access network device for the transmitting of the uplink data of the terminal device.

Since there might be a change in the quality of link between the terminal device and the secondary access network prior to and posterior to the state switching of the terminal device, before the terminal device enters the non-activated state, the link quality of the secondary access network may meet the needs of data transmission of the terminal device, however, after the terminal device enters the non-activated state, the link quality of the secondary access network may not be able to meet the needs of data transmission of the terminal device. Therefore, after the terminal device enters the non-activated state, the link quality of the secondary access network may be detected. For example, after the terminal device is in the non-activated state, it may detect the link quality of the secondary access network to which it is connected before entering the non-activated state. Alternatively, the terminal device may also measure the secondary access network devices around the first primary access network device. Optionally, the terminal device may measure the secondary network according to a network protocol or configuration of the first primary network device. For example, according to the network protocol or the configuration of the first primary network device, the secondary networks around the first primary network device are measured at regular intervals. Optionally, the terminal device can measure the secondary network according to network configuration information in a received system message, the embodiment of the present application does not impose any limitation on the this.

Therefore, in the communication method of the embodiment of the present application, when the secondary connection between the terminal device and the secondary access network device is in the suspend state, the first primary access network device can, according to the first message sent by the terminal device in the non-activated state upon determining that there is data needing to be transmitted, control the secondary connection between the terminal device and the secondary access network device, namely, whether to continue the use of the secondary connection between the terminal device and the secondary access network device or release the secondary connection between the terminal device and the secondary access network device, instead of the direct use of the secondary connection between the terminal device and the secondary access network device for data transmission.

For example, based on the link quality of the secondary access network, the first primary access network device can determine whether to resume the use of or release the secondary connection between the terminal device and the secondary access network device, instead of directly resuming the use of the secondary connection between the terminal device and the secondary access network device regardless of the link quality of the secondary access network, which ensures the reliability of data transmission of the terminal device.

Further, the step S220 may include the following steps:

If the first message includes the link quality information of the secondary access network, the first primary access network device controls the secondary connection between the terminal device and the secondary access network device according to the link quality information of the secondary access network.

Specifically, the terminal device may detect the link quality of the secondary access network and may further include the link quality information of the secondary access network in the first message, so that the first primary access network device may control the secondary connection between the terminal device and the secondary access network device according to the link quality information of the secondary access network in the first message.

In an embodiment of the present application, the link quality information of the secondary access network may include link quality information of a secondary access network to which the terminal device is connected before it enters the non-activated state, or link quality information of the secondary access networks around the first primary access network device. The first primary access network device may determine whether to resume the use of the secondary connection in the suspend state or release the secondary connection in the suspend state according to the link quality information of the secondary access networks. Alternatively, the first primary access network device may also select a secondary access network that enables data transmission of the terminal device according to the link quality information of the secondary access networks around the first primary access network device, to establish a new secondary connection with the terminal device.

In an embodiment of the present application, the first message may be an RRC connection setup request message, that is to say, the terminal device may allow the link quality information of the secondary access network to be carried in the RRC connection setup request message to be sent to the first primary network device. Alternatively, the first message may be an RRC connection setup complete message, that is to say, the terminal device may allow the link quality information of the secondary access network to be carried in the RRC connection setup completion message to be sent to the first primary access network device.

It should be understood that in an embodiment of the present application, the first message carrying the link quality information of the secondary access network listed above is exemplary illustration only and should not impose any limitation on the present application. The link quality information of the secondary access network may be carried in an existing message specified in an existing protocol (for example, specific messages listed above or other existing messages), namely, the link quality information of the secondary access network is added in the existing message; or it may be carried in a message that is newly added, namely, the message that is newly added in the existing protocol carries the link quality information of the secondary access network, which is not particularly limited in the present application. It is easier to implement the method for carrying the link quality information of the secondary access network in the existing message prescribed in the existing protocol, which can also reduce signaling overheads.

Optionally, the terminal device may directly include a link quality value of the secondary access network in the first message and report it to the first primary access network device, which then controls the secondary connection between the terminal device and the secondary access network device based on the link quality value of the secondary access network included in the first message.

In this case, the first primary access network device controlling the secondary connection between the terminal device and the secondary access network device based on the link quality value of the secondary access network includes:

if the link quality value of the secondary access network is not less than a pre-configured link quality threshold, the first primary access network device control to restore the secondary connection between the terminal device and the secondary access network device; or if the link quality value of the secondary access network is less than the pre-configured link quality threshold, the first primary access network device control to release the secondary connection between the terminal device and the secondary access network device.

In an embodiment of the present application, if the first and second primary access network devices are the same network device, the secondary connection between the terminal device and the secondary access network device is suspended by the first primary access network device, therefore, the first primary access network device is aware of configuration information of the secondary connection between the terminal device and the secondary access network device, for example, the above pre-configured link quality threshold for the control of the secondary connection.

Alternatively, if the first and second primary access network devices are different network devices, the secondary connection between the terminal device and the secondary access network device is suspended by the second primary access network device, therefore, the first primary access network device is not aware of the configuration information of the secondary connection between the terminal device and the secondary access network device, in that case, the method further includes:

The first primary access network device acquiring the configuration information of the secondary connection from the second primary access network device, wherein the configuration information of the secondary connection is used by the first primary access network device to control the secondary connection according to the configuration information of the secondary connection.

Optionally, the configuration information of the secondary connection includes the link quality threshold of the secondary access network, that is, the pre-configured link quality threshold described above.

Specifically, the first primary access network device may send, to the second primary access network device, a sixth message which requests for acquiring context information of the terminal device in the second primary access network, and the second primary access network device may feedback a response message of the sixth message to the first primary access network device. The sixth message includes the context information of the terminal device in the second access network. Optionally, the response message of the sixth message may further include configuration information of the secondary connection.

Optionally, the sixth message may include an Initial Context Setup Request message and the response message to the sixth message may include an Initial Context Setup Response message. That is to say, the first primary access network device may obtain the configuration information of the secondary connection based on the Initial Context Setup Request message and the second primary access network device may notify the first primary access network device of the configuration information of the secondary connection based on the Initial Context Setup Response message.

Optionally, in some embodiments, the first primary access network device controlling the secondary connection between the terminal device and the secondary access network device according to the link quality information of the secondary access network include:

if the link quality information of the secondary access network indicates that the secondary access network is available or the link quality of the secondary access network meets a preset condition, the first primary access network device controls to restore the secondary connection between the terminal device and the secondary access network device; or if the link quality information of the secondary access network indicates that the secondary access network is unavailable or the link quality of the secondary access network does not meet a preset condition, the first primary access network device controls to release the secondary connection between the terminal device and the secondary access network device.

That is to say, the terminal device may determine, according to the detected link quality information of the secondary access network, whether the secondary access network is available or whether the link quality of the secondary access network meets the preset condition, in this case, the link quality information of the secondary access network included in the first message is information used by the terminal device to determine whether the secondary access network is available or whether the link quality of the secondary access network meets the preset condition. Therefore, the link quality information of the secondary access network may be interpreted as indication information which indicates whether the secondary access network is available or whether the link quality of the secondary access network meets the preset condition. In this case, the link quality information of the secondary access network may be 1-bit indication information which indicates whether the secondary access network is available or whether the link quality of the secondary access network satisfies the preset condition.

In an embodiment of the present application, the secondary access network is available means that the link quality of the secondary access network is greater than a preset link quality threshold, or a quality of service (QoS) of the secondary access network satisfies data transmission, the secondary access network device is not in a congested state. The link quality of the secondary access network meeting the preset condition may include that the link quality of the secondary access network is greater than a preset link quality threshold, or the QoS of the secondary access network satisfies the data transmission and the secondary access network device is not in the congested state, the embodiment of the present application does not impose any limitation on this.

Accordingly, the secondary access network is not available means that the link quality of the secondary access network is less than the preset link quality threshold, or the QoS of the secondary access network is not enough for data transmission or the secondary access network device is in the congested state. The link quality of the secondary access network failing to meet the preset condition means that the link quality of the secondary access network is less than the preset link quality threshold, or the QoS of the secondary access network is not good enough for data transmission and the secondary access network device is in the congested state, the embodiment of the present application does not impose any limitation on this.

Optionally, as an embodiment, the step S220 may further include:

if the first message does not include the link quality information of the secondary access network, the first primary access network device releases the secondary connection between the terminal device and the secondary access network device.

That is to say, the first message may not include the link quality information of the secondary access network and the terminal device and the first primary access network device may be configured to instruct the first primary access network device to release the secondary connection when the first message does not include the link quality information of the secondary access network. So, upon receiving the first message including no link quality information of the secondary access network, the first primary access network device may control the releasing of the secondary connection between the terminal device and the secondary access network device.

Optionally, the terminal device and the first primary access network device may also be configured to instruct the first primary access network device to release the secondary connection when the first message does not include the link quality information of the secondary access network. So, upon receiving the first message including no link quality information of the secondary access network, the first primary access network device may control the resuming of the secondary connection between the terminal device and the secondary access network device.

Optionally, in some embodiments, the first message includes first indication information which indicates that the terminal device proposes to restore or release the secondary connection.

The first primary access network device controlling the secondary connection between the terminal device and the secondary access network device according to the first message includes:

the first primary access network device controlling the secondary connection between the terminal device and the secondary access network device according to the first indication information in the first message.

Further, the first primary access network device controlling the secondary connection between the terminal device and the secondary access network device according to the first indication information in the first message includes:

if the first indication information indicates that the terminal device proposes to restore the secondary connection, the first primary access network device restores the secondary connection between the terminal device and the secondary access network device; or if the first indication information indicates that the terminal device proposes to release the secondary connection, the first primary access network device releases the secondary connection between the terminal device and the secondary access network device.

Optionally, the terminal device may also detect the secondary access networks around the first primary access network and the first message may also include link quality information of the secondary access networks around the first primary access network detected by the terminal device. The first primary access network device selects the secondary access network for the terminal device for subsequent data transmission according to the link quality information of the secondary access networks around the first primary access network. Alternatively, the terminal device may also determine at least one secondary access network according to the link quality information of the detected secondary access networks around the first primary access network. Therefore, the first indication information may also be indicative of information of the at least one secondary access network to which the terminal device proposes or intends to establish the secondary connection. According to the first indication information, the first primary access network device may establish secondary connections between the terminal device and some or all of the at least one secondary access network indicated by the first indication information.

Optionally, in some embodiments, the first primary access network device resuming the secondary connection between the terminal device and the secondary access network device specifically includes:

the first primary access network device sending, to the secondary access network device, a second message, which requests the secondary access network device to restore the secondary connection; and receiving, by the first primary access network device, a response message of the second message sent by the secondary access network device, which indicates that the secondary access network device has restored the secondary connection.

Optionally, the second message may be a secondary connection restoration request message or a secondary connection addition request message. Correspondingly, the response message of the second message may be a secondary connection restoration confirmation message or a secondary connection addition request confirmation message.

In an embodiment of the present application, the second message and the response message of the second message may be other messages used for communication between the access network devices, which is not limited by the embodiment of the present application.

In this case, after the first primary access network device receives the response message of the second message, the method further includes:

the first primary access network device sending, to the terminal device, a third message which notifies the terminal device to restore related configuration of the secondary connection.

In an embodiment of the present application, if the first message is an RRC connection request message, the third message may be an RRC Connection Setup message; or, if the first message is an RRC connection setup complete message, the third message may be an RRC Connection Reconfiguration message.

Optionally, in some embodiments, the first primary access network device releasing the secondary connection between the terminal device and the secondary access network device specifically includes:

the first primary access network device sending, to the secondary network device, a fourth message which requests the secondary access network device to release the secondary connection; and receiving, by the first primary access network device, a response message of the fourth message sent by the secondary access network device, which indicates that the secondary access network device has released the secondary connection.

In this case, after the first primary access network device receives the response message of the fourth message sent by the secondary access network device, the method further includes:

the first primary access network device sending, to the terminal device, a fifth message which notifies the terminal device that the secondary access network device has released the secondary connection.

In an embodiment of the present application, if the first message is an RRC connection request message, the fifth message may be an RRC Connection Setup message; or if the first message is an RRC connection setup complete message, the fifth message may be an RRC Connection Release message.

Optionally, in some embodiments, the fifth message includes second indication information, which instructs the terminal device to release configuration information related to the secondary connection.

The communication method according to the embodiments of the present application is described above in detail in terms of the access network device with reference to FIG. 2 and the communication method according to the embodiments of the present application will be described in detail below in terms of the terminal device with reference to FIG. 3. It should be understood that the description of the terminal device corresponds to that of the access network device and please refer to the above-described for similar description, which will not be elaborated herein to avoid repetitive description.

Figure 3:
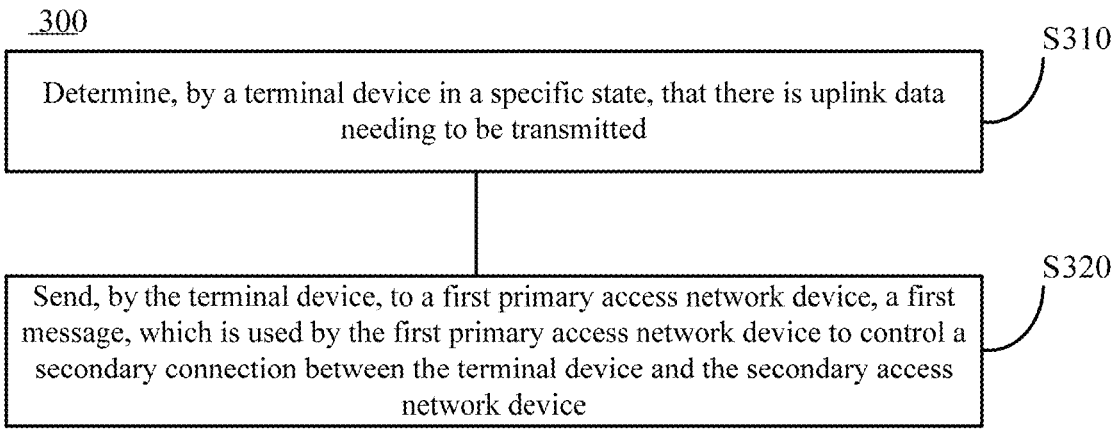
FIG. 3 is a schematic flowchart of a communication method according to another embodiment of the present application.

FIG. 3 is a schematic flowchart showing a communication method according to another embodiment of the present application. As shown in FIG. 3, the method 300 includes the following steps.

In step S310, a terminal device in a specific state determines that there is uplink data needing to be transmitted.

In step S320, the terminal device sends, to a first primary access network device, a first message, which is used by the first primary access network device to control a secondary connection between the terminal device and the secondary access network device.

Optionally, in some embodiments, the specific state is a suspend state or a non-activated state.

In an embodiment of the present disclosure, when the terminal device is in the specific state, the secondary connection between the terminal device and the secondary access network device is in the suspend state. In that case, upon determining that there is uplink data to be transmitted, the terminal device may send, to the first primary access network device, the first message, which is used to transition the terminal device from the specific state to a state in which normal data transmission can be performed. The first message may be used by the first primary access network device for the control of the secondary connection between the terminal device and the secondary access network device.

Optionally, in some embodiments, the first message is a radio resource control RRC message.

Optionally, in some embodiments, the first message is an RRC message which requests for switching the terminal device from a first state to a second state, or an RRC message which indicates that the terminal device has been switched from the first state to the second state.

Optionally, in some embodiments, prior to sending, by the terminal device, the first message to the first primary access network device, the method further includes:

detecting, by the terminal device, a link quality of a secondary access network.

sending, by the terminal device, the first message to the first primary access network device includes:

sending, by the terminal device, the first message including link quality information of the secondary access network to the first primary access network device.

Specifically, after entering the specific state, the terminal device may detect a secondary access network to which it is connected before entering the specific state, and determine link quality information of the secondary access network, and then it may allow the link quality information of the secondary access network to be included in the first message. Thus, the first primary access network device may control the secondary connection between the terminal device and the secondary access network device according to the link quality information of the secondary access network in the first message.

Optionally, the terminal device may also detect secondary access networks around the first primary access network device to acquire their link quality information. The terminal device may allow the link quality information to be directly carried in the first message and the first primary access network device determines an available secondary access network based on such link quality information. Alternatively, the terminal device may also determine an available secondary access network according to the link quality information of the secondary access networks around the first primary access network device and allows information about the available secondary access network determined by the terminal device to be included in the first message. That is to say, the terminal device may include, in the first message, information about the secondary access network to which the terminal device proposes to establish a secondary connection.

The method used by the terminal device or the first primary access network device for the determining of an available secondary access network may refer to the relevant descriptions of the foregoing embodiments, in which it is determined that the secondary access network is available or the link quality of the secondary access network meets a preset condition, which will not be elaborated herein.

Optionally, the link quality information of the secondary access network indicates that the secondary access network is available or the link quality of the secondary access network meets a preset condition; or the link quality information of the secondary access network indicates that the secondary access network is unavailable or the link quality of the secondary access network does not meet a preset condition; or the link quality information of the secondary access network is indicative of a link quality value of the secondary access network.

Optionally, in some embodiments, the first message includes first indication information, which indicates that the terminal device proposes to restore or release the secondary connection.

Optionally, in some embodiments, the method further includes:

receiving, by the terminal device, a second message sent by the first primary access network device, which notifies the terminal device to restore configuration information related to the secondary connection.

Optionally, in some embodiments, the second message is an RRC message.

Optionally, in some embodiments, the method further includes:

receiving, by the terminal device, a third message sent by the first primary access network device, which notifies the terminal device that the secondary access network device has released the secondary connection.

Optionally, in some embodiments, the third message includes second indication information, which instructs the terminal device to release configuration information related to the secondary connection.

Optionally, in some embodiments, the third message is an RRC message.

Optionally, in some embodiments, the method further includes:

receiving, by the terminal device, a fourth message sent by the second access network device, which is a primary access network device to which the terminal device is connected before it enters the specific state;

suspending, by the terminal device, the secondary connection between the terminal device and the secondary access network device according to the fourth message.

Optionally, in some embodiments, the fourth message is an RRC message.

The embodiments of the present application are described in detail above in terms of the access network device and the terminal device, respectively, in conjunction with FIGS. 2 to 3. Furthermore, the embodiments of the present application will be described in detail below in terms of the interaction of devices in conjunction with FIGS. 4 and 5.

The terminal device is connected to the second primary access network device before it enters the non-activated state. However, after entering the non-activated state, when determining that there is uplink data to be transmitted, the terminal device is in a network covered by the first primary access network device. The first and second primary access network devices may be the same network device or different network devices. That is to say, the terminal device may be in the same network or in different networks prior to or posterior to the state switching, or, access network nodes in which the terminal device is located prior to or posterior to the state switching are changed or remain unchanged.

Figure 4:
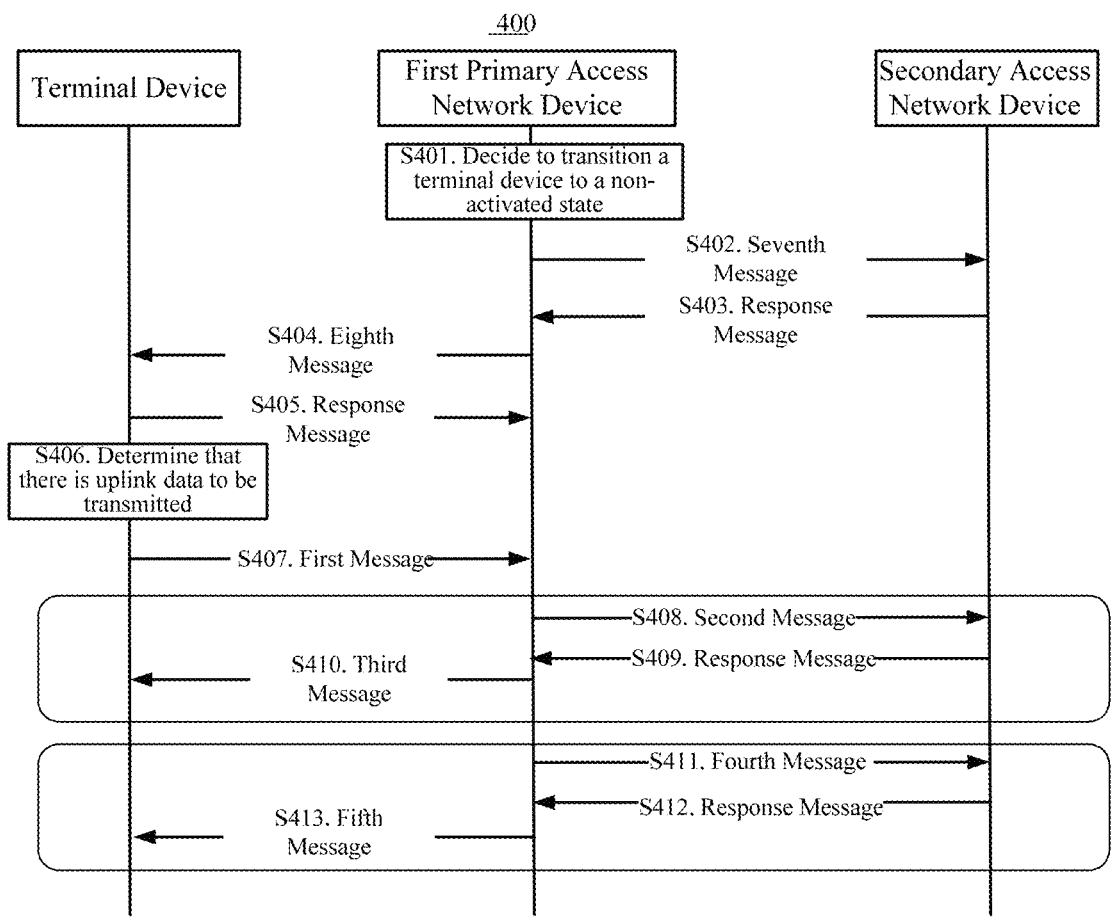
FIG. 4 is a schematic diagram of the interaction of a communication method according to an embodiment of the present application.

FIG. 4 is a schematic diagram illustrating the interaction of a communication method 400 in accordance with an embodiment of the present application when an access network node is not changed.

In step S401, a first primary access network device decides to transition a terminal device to a non-activated state.

The first primary access network device may transition the terminal device to the non-activated state when the terminal device is in an inactive state or has no data to be transmitted.

In step S402, the first primary access network device sends, to a secondary access network device, a seventh message, which suspends a secondary connection between the terminal device and the secondary access network device.

In step S403, the secondary access network device sends, to the first primary access network device, a response message of the seventh message, which indicates that the secondary access network device has suspended the secondary connection.

Optionally, the secondary access network device saves configuration information related to the secondary connection after it suspends the secondary connection.

In step S404, the first primary access network device sends, to the terminal device, an eighth message, which instructs the terminal device to suspend the secondary connection with the secondary access network device.

Optionally, the eighth message may be an RRC connection reconfiguration message, that is, the first primary access network device may allow an instruction, which instructs the terminal device to suspend the secondary connection, to be carried in the RRC connection reconfiguration message.

Optionally, the terminal device may save configuration information related to current primary connection and the secondary connection after the receiving of the eighth message.

Optionally, the terminal device may detect a link quality of a secondary access network to which the suspended secondary connection corresponds, or it may also detect a link quality of secondary access networks around the first primary access network device, to obtain link quality information of the secondary access networks around the first primary access network device.

Optionally, the eighth message may not include the instruction which instructs the terminal device to suspend the secondary connection, and the terminal device may assume that the secondary connection needs to be suspended when the instruction is not included in the eighth message.

In step S405, the terminal device sends, to the first primary access network device, a response message of the eighth message, which indicates that the terminal device has suspended the secondary connection.

In step S406, the terminal device determines that there is uplink data to be transmitted.

In step S407, the terminal device sends a first message to the first primary access network device.

Therefore, the first primary access network device may control a secondary connection between the terminal device and the first primary access network device according to the first message.

The first primary access network device controls the secondary connection between the terminal device and the first primary access network device according to the first message, a specific process of which may refer to the relevant description in the step S220, it will not be elaborated herein.

Optionally, the first message may be an RRC connection setup request message or an RRC connection setup complete message.

If the first primary access network device determines that the secondary connection needs to be restored according to the first message, the first primary access network device controls the restoring of the secondary connection, and the process proceeds to S408.

In step S408, the first primary access network device sends, to the secondary access network device, a second message which requests for restoring the secondary connection.

In step S409, the secondary access network device sends, to the first primary access network device, a response message of the second message, which indicates that the secondary access network device has restored the secondary connection.

In step S410, the first primary access network device sends, to the terminal device, a third message which requests the terminal device to restore the secondary connection.

Optionally, if the first message is an RRC connection setup request message, the third message may be an RRC connection setup response message, or if the first message is an RRC connection setup complete message, the third message may be an RRC connection reconfigure message.

Alternatively, if the first primary access network device determines whether the secondary connection needs to be released according to the first message, the first primary access network device controls the releasing of the secondary connection, and the process proceeds to S411.

In step S411, the first primary access network device sends, to the secondary access network device, a fourth message which requests for releasing the secondary connection.

In step S412, the secondary access network device sends, to the first primary access network device, a response message of the fourth message, which indicates that the secondary access network device has released the secondary connection.

In step S413, the first primary access network device sends, to the terminal device, a fifth message which requests the terminal device to release the secondary connection.

The terminal device releases configuration information related to the secondary connection after it receives the fifth message.

Optionally, if the first message is an RRC connection setup request message, the fifth message may be an RRC connection setup response message, or if the first message is an RRC connection setup complete message, the fifth message may be an RRC connection reconfigure message.

Figure 5:
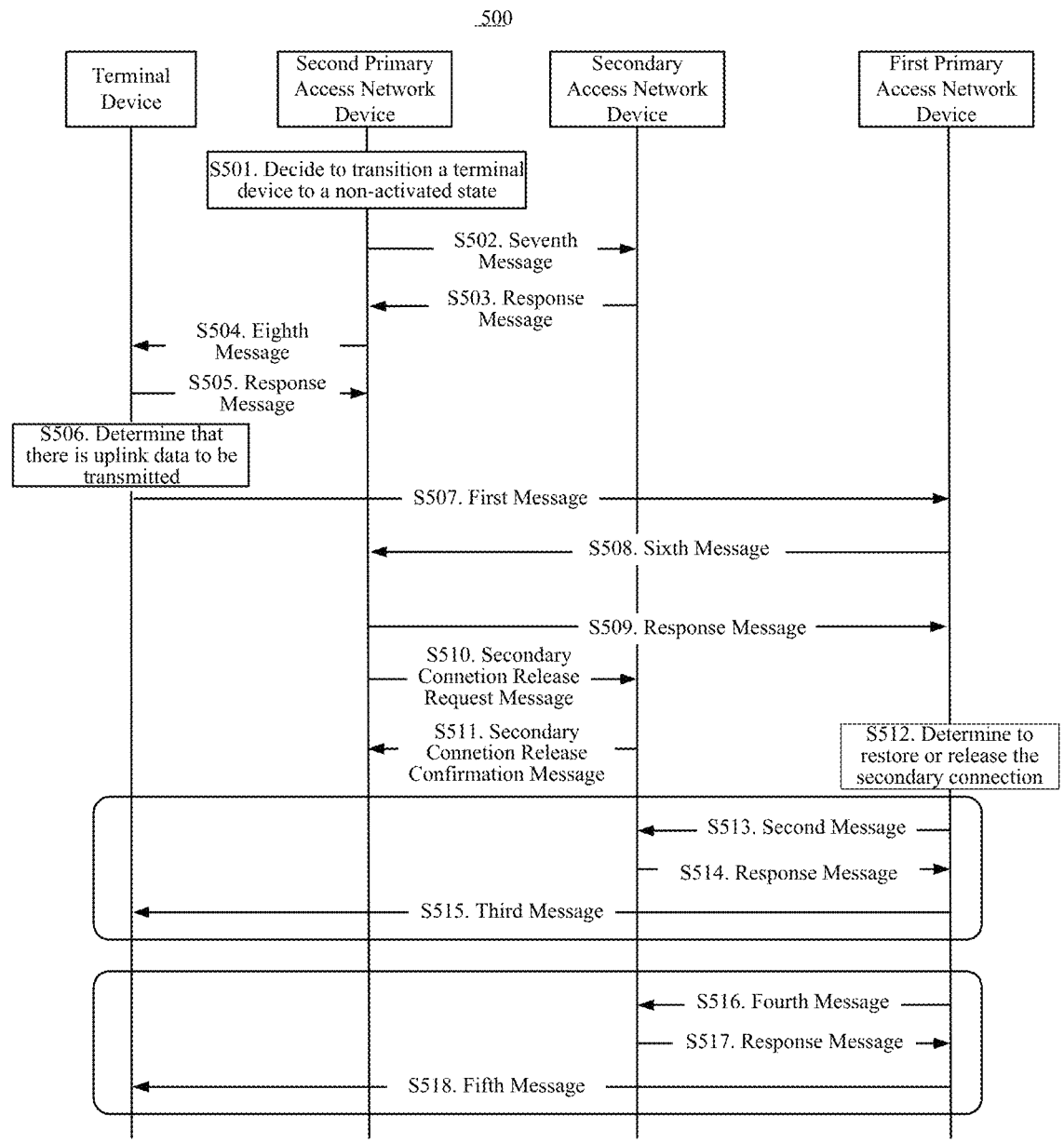
FIG. 5 is a schematic diagram of the interaction of a communication method according to another embodiment of the present application.

FIG. 5 is a schematic diagram illustrating the interaction of a communication method 500 according to an embodiment of the present application when an access network node is changed.

In step S501, a second primary access network device decides to transition a terminal device to a non-activated state.

The second primary access network device may transition the terminal device to the non-activated state when the terminal device is in an inactive state or has no data to be transmitted.

In step S502, the second primary access network device sends, to a secondary access network device, a seventh message, which suspends a secondary connection between the terminal device and the secondary access network device.

In step S503, the secondary access network device sends, to the second primary access network device, a response message of the seventh message, which indicates that the secondary access network device has suspended the secondary connection.

Optionally, the secondary access network device saves configuration information related to the secondary connection after it suspends the secondary connection.

In step S504, the second primary access network device sends, to the terminal device, an eighth message, which instructs the terminal device to suspend the secondary connection with the secondary access network device.

Optionally, the eighth message may be an RRC connection reconfiguration message, that is, the second primary access network device may allow an instruction, which instructs the terminal device to suspend the secondary connection, to be carried in the RRC connection reconfiguration message.

Optionally, the terminal device may save configuration information related to current primary connection and the secondary connection after the receiving of the eighth message.

Optionally, the terminal device may detect a link quality of a secondary access network to which the suspended secondary connection corresponds, or it may also detect a link quality of secondary access networks around the second primary access network device, to obtain link quality information of the secondary access networks around the second primary access network device.

Optionally, the eighth message may not include the instruction which instructs the terminal device to suspend the secondary connection, and the terminal device may assume that the secondary connection needs to be suspended when the instruction is not included in the eighth message.

In step S505, the terminal device sends, to the second primary access network device, a response message of the eighth message, which indicates that the terminal device has suspended the secondary connection.

In step S506, the terminal device determines that there is uplink data to be transmitted.

In this case, the terminal device is moved to an access network area where a first primary access network device is located.

In step S507, the terminal device sends a first message to the first primary access network device.

Optionally, the first message may be an RRC connection setup request message or an RRC connection setup complete message.

In step S508, the first primary access network device sends, to the second primary access network device, a sixth message which is used to obtain configuration information related to the secondary connection.

Optionally, the sixth message may be a message which requests for obtaining context information of the terminal device, for example, an initial context setup request message.

In step S509, the second primary access network device sends, to the first primary access network device, a response message of the sixth message, which includes context information of the terminal device in a second primary access network. Optionally, the response message may further include configuration information related to the secondary connection, which may include a link quality threshold used for the control of the secondary connection.

In step S510, the second primary access network device sends, to the secondary access network device, a secondary connection release request message, which releases the secondary connection between the terminal device and the secondary access network device.

In step S511, the secondary access network device sends, to the second primary access network device, a secondary connection release confirmation message, which indicates that the secondary access network device has released the secondary connection between the terminal device and the secondary access network device.

In this way, the terminal device cannot perform data transmission through the primary connection between the terminal device and the second primary access network device and the secondary connection between the terminal device and the secondary access network device.

In step S512, the first primary access network device determines whether the secondary connection needs to be restored or released according to the first message, and upon determining that the secondary connection needs to be restored, the first primary access network device controls the restoring of the secondary connection, and the process proceeds to S513.

The first primary access network controls the secondary connection between the terminal device and the first primary access network device according to the first message, a specific process of which may refer to the relevant description in the step S220, it will not be elaborated herein.

In step S513, the first primary access network device sends, to the secondary access network device, a second message which requests for restoring the secondary connection.

In step S514, the secondary access network device sends, to the first primary access network device, a response message of the second message, which indicates that the secondary access network device has restored the secondary connection.

In step S515, the first primary access network device sends, to the terminal device, a third message which requests the terminal device to restore the secondary connection.

Before the terminal device enters the non-activated state, dual connections or multiple connections of the terminal device include the primary connection between the terminal device and the second primary access network device and the secondary connection between the terminal device and the secondary access network device. Subsequent to the step S515, the dual connections or multiple connections of the terminal device include a primary connection between the terminal device and the first primary access network device and the secondary connection between the terminal device and the secondary access network device. In this case, the terminal device may perform data transmission through the primary connection between the terminal device and the first primary access network device and the secondary connection between the terminal device and the secondary access network device.

Optionally, if the first message is an RRC connection setup request message, the third message may be an RRC connection setup response message, or if the first message is an RRC connection setup complete message, the third message may be an RRC connection reconfigure message.

Alternatively, if the first primary access network device determines whether the secondary connection needs to be released according to the first message, the first primary access network device controls the releasing of the secondary connection, and the process proceeds to S516.

In step S516, the first primary access network device sends, to the secondary access network device, a fourth message which requests for releasing the secondary connection.

In step S517, the secondary access network device sends, to the first primary access network device, a response message of the fourth message, which indicates that the secondary access network device has released the secondary connection.

In step S518, the first primary access network device sends, to the terminal device, a fifth message which requests the terminal device to release the secondary connection.

The terminal device releases configuration information related to the secondary connection after it receives the fifth message.

Optionally, if the first message is an RRC connection setup request message, the fifth message may be an RRC connection setup response message, or if the first message is an RRC connection setup complete message, the fifth message may be an RRC connection reconfigure message.

The method embodiment of the present application is described in detail above with reference to FIGS. 2 to 5. A device embodiment of the present application will be described in detail below with reference to FIGS. 6 and 9. It should be understood that the device embodiment and the method embodiment correspond to each other, please refer to the method embodiment for similar description.

Figure 6:
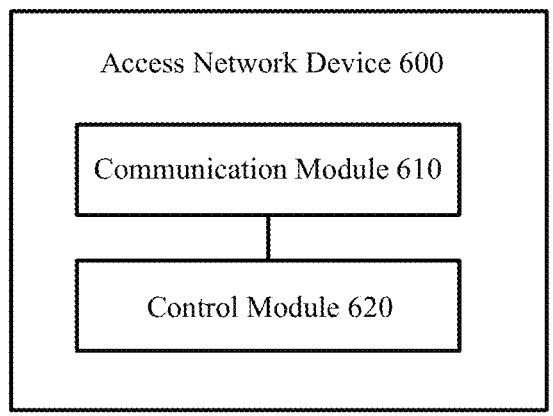
FIG. 6 is a schematic block diagram of an access network device according to an embodiment of the present application.

FIG. 6 is a schematic block diagram of an access network device according to an embodiment of the present application. An access network device 600 of FIG. 5 includes:

a communication module 610 configured to receive a first message sent by a terminal device in a specific state when there is uplink data to be transmitted; and a control module 620 configured to control a secondary connection between the terminal device and a secondary access network device according to the first message.

Optionally, in some embodiments, the specific state is a suspend state or a non-activated state.

Optionally, in some embodiments, the first message is a radio resource control RRC message.

Optionally, in some embodiments, the first message is an RRC message which requests for switching the terminal device from a first state to a second state, or an RRC message which indicates that the terminal device has been switched from the first state to the second state.

Optionally, in some embodiments, if a second primary access network device to which the terminal device is connected before it enters the specific state is the same as the access network device, the control module 620 is further configured to:

before the communication module 610 receives the first message, suspend the secondary connection between the terminal device and the secondary access network device and transition the terminal device to the specific state.

Optionally, in some embodiments, the control module 620 is specifically configured to:

control the secondary connection between the terminal device and the secondary access network device according to link quality information of a secondary access network if the first message includes the link quality information of the secondary access network.

Optionally, in some embodiments, the control module 620 is specifically configured to:

control to restore the secondary connection between the terminal device and the secondary access network device if the link quality information of the secondary access network indicates that the secondary access network is available, or a link quality of the secondary access network meets a preset condition; or control to release the secondary connection between the terminal device and the secondary connection network device if the link quality information of the secondary access network indicates that the secondary access network is unavailable, or the link quality of the secondary access network does not meet a preset condition.

Optionally, in some embodiments, the control module 620 is further configured to:

control the secondary connection between the terminal device and the secondary access network device according to a link quality value of the secondary access network, if the link quality information of the secondary access network is indicative of the link quality value of the secondary access network.

Optionally, in some embodiments, the control module 620 is specifically configured to:

control to restore the secondary connection between the terminal device and the secondary access network device if the link quality value of the secondary access network is not less than a pre-configured link quality threshold; or control to release the secondary connection between the terminal device and the secondary access network device if the link quality value of the secondary access network is less than the pre-configured link quality threshold.

Optionally, in some embodiments, the control module 620 is further configured to:

control to release the secondary connection between the terminal device and the secondary access network device if the first message does not include the link quality information of the secondary access network.

Optionally, in some embodiments, the first message includes first indication information, which indicates that the terminal device proposes to restore or release the secondary connection.

The control module 620 is further configured to:

control the secondary connection between the terminal device and the secondary access network device according to the first indication information in the first message.

Optionally, in some embodiments, the control module 620 is specifically configured to:

control to restore the secondary connection between the terminal device and the secondary access network device if the first indication information indicates that the terminal device proposes to restore the secondary connection; or control to release the secondary connection between the terminal device and the secondary access network device if the first indication information indicates that the terminal device proposes to release the secondary connection.

Optionally, in some embodiments, the communication module 610 is further configured to:

send, to the secondary access network device, a second message, which requests the secondary access network device to restore the secondary connection; and receive a response message of the second message sent by the secondary access network device, which indicates that the secondary access network device has restored the secondary connection.

Optionally, in some embodiments, the communication module 610 is further configured to:

send, to the terminal device, a third message, which notifies the terminal device to restore related configuration of the secondary connection.

Optionally, in some embodiments, the third message is an RRC message.

Optionally, in some embodiments, the communication module 610 is further configured to:

send, to the secondary access network device, a fourth message, which requests the secondary access network device to release the secondary connection; and receive a response message of the fourth message sent by the secondary access network device, which indicates that the secondary access network device has released the secondary connection.

Optionally, in some embodiments, the communication module 610 is further configured to:

send, to the terminal device, a fifth message, which notifies the terminal device that the secondary access network device has released the secondary connection.

Optionally, in some embodiments, the fifth message includes second indication information, which indicates that the terminal device to release configuration information related to the secondary connection.

Optionally, in some embodiments, the fifth message is an RRC message.

Optionally, in some embodiments, if the second primary access network device to which the terminal device is connected before it enters the specific state is different from the access network device, the access network device further includes:

an obtaining module configured to obtain configuration information of the secondary connection from the second primary access network device.

Optionally, in some embodiments, the communication module 610 is specifically configured to:

send, to the second primary access network device, a sixth message, which requests for obtaining context information of the terminal device in a second primary access network; and receive a response message of the sixth message sent by the second primary access network device, which includes the configuration information of the secondary connection.

Specifically, the access network device 600 may correspond to the first access network device (for example, it may be configured as the first access network device or it is the first access network device) described in the foregoing method 200, 400 or 500. Moreover, modules or units in the access network device 600 are configured to perform actions or processes performed by the first access network device in the method 200, 400 or 500, respectively, detailed descriptions thereof will be omitted here in order to avoid redundancy.

Figure 7:
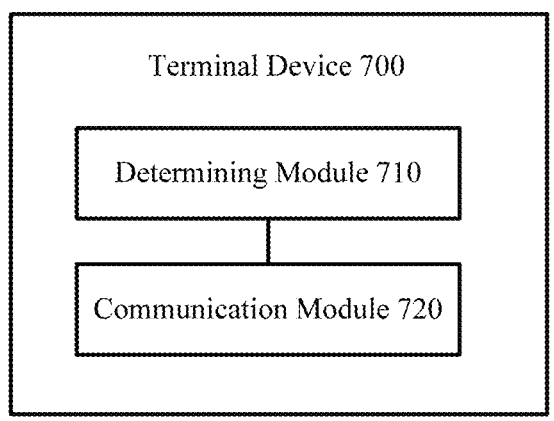
FIG. 7 is a schematic block diagram of a terminal device according to an embodiment of the present application.

FIG. 7 is a schematic block diagram of a terminal device according to an embodiment of the present application. A terminal device 700 of FIG. 7 includes:

a determining module 710 configured to determine that there is uplink data to be transmitted when the terminal device is in a specific state; and a communication module 720 configured to send, to a first primary access network device, a first message, which is used by the first primary access network device to control a secondary connection between the terminal device and a secondary access network device.

Optionally, in some embodiments, the specific state is a suspend state or a non-activated state.

Optionally, in some embodiments, the first message is a radio resource control RRC message.

Optionally, in some embodiments, the first message is a first RRC message which requests for switching the terminal device from a first state to a second state, or a second RRC message which indicates that the terminal device has been switched from the first state to the second state.

Optionally, in some embodiments, the terminal device further includes:

a detecting module configured to detect a link quality of the secondary access network.

The communication module 720 is further configured to:

send, to the first primary access network device, the first message including link quality information of the secondary access network.

Optionally, in some embodiments, the link quality information of the secondary access network indicates that the secondary access network is available or a link quality of the secondary access network meets a preset condition; or the link quality information of the secondary access network indicates that the secondary access network is unavailable or the link quality of the secondary access network does not meet a preset condition; or the link quality information of the secondary access network is indicative of a link quality value of the secondary access network.

Optionally, in some embodiments, the first message includes first indication information, which indicates that the terminal device proposes to restore or release the secondary connection.

Optionally, in some embodiments, the communication module 720 is further configured to:

receive a second message sent by the first primary access network device, which notifies the terminal device to restore configuration information related to the secondary connection.

Optionally, in some embodiments, the second message is an RRC message.

Optionally, in some embodiments, the communication module 720 is further configured to:

receive a third message sent by the first primary access network device, which notifies the terminal device that the secondary access network device has released the secondary connection.

Optionally, in some embodiments, the third message includes second indication information, which instructs the terminal device to release configuration information related to the secondary connection.

Optionally, in some embodiments, the third message is an RRC message.

Optionally, in some embodiments, the communication module 720 is further configured to:

receive a fourth message sent by the second access network device, which is a primary access network device to which the terminal device is connected before it enters the specific state.

The terminal device further includes:

a control module configured to suspend the secondary connection between the terminal device and the secondary access network device according to the fourth message.

Optionally, in some embodiments, the fourth message is an RRC message.

Specifically, the terminal device 700 may correspond to the terminal device (for example, it may be configured as the terminal device or it is the terminal device) described in the foregoing method 200, 400 or 500. Moreover, modules or units in the terminal device 700 are configured to perform actions or processes performed by the terminal device 700 in the method 200, 400 or 500, respectively, detailed descriptions thereof will be omitted here in order to avoid redundancy.

Figure 8:
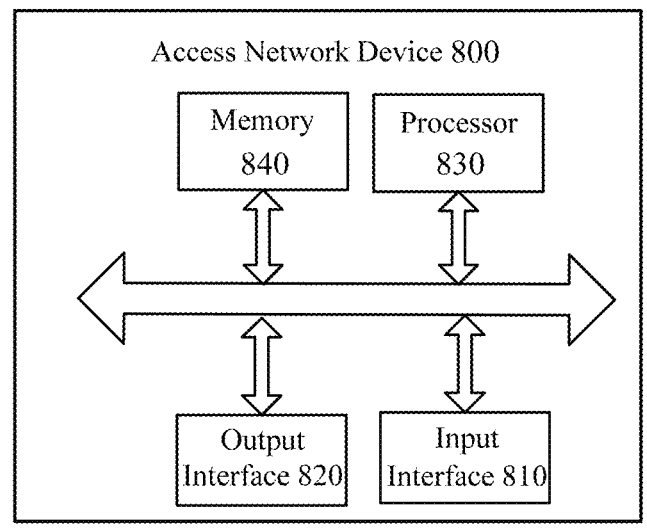
FIG. 8 is a schematic block diagram of an access network device according to another embodiment of the present application.

As shown in FIG. 8, an embodiment of the present application further provides an access network device 800, which may be the access network device 600 in FIG. 6 and can be used to perform contents of the first access network device corresponding to the method 200, 400 or 500 in FIG. 2. The access network device 800 includes: an input interface 810, an output interface 820, a processor 830 and a memory 840, all of which can be connected through a bus system. The memory 840 is configured to store programs, instructions or codes. The processor 830 is configured to execute the programs, instructions or codes in the memory 840 to control the input interface 810 to receive a signal, control the output interface 820 to transmit a signal, and complete the operations in the foregoing method embodiments.

It should be understood that, in the embodiments of the present application, the processor 830 may be a central processing unit ("CPU"), and it may also be other general-purpose processors, digital signal processors (DSPs), application specific integrated circuits (ASICs), field programmable gate array (FPGAs) or other programmable logic devices, discrete gates or transistor logic devices, discrete hardware components, and the like. The general purpose processor may be a microprocessor or the processor may also be any conventional processor or the like.

The memory 840 can include read only memory and random access memory and it provides instructions and data to the processor 830. A portion of the memory 840 can also include a non-volatile random access memory. For example, the memory 840 can also store information on device type.

In the implementation process, contents of the above method may be completed by an integrated logic circuit of hardware in the processor 830 or an instruction in a form of software. The contents of the method disclosed in the embodiments of the present application may be directly implemented as performed by a hardware processor, or may be performed by a combination of hardware and software modules in the processor. The software module can be located in a conventional storage medium such as random access memory, flash memory, read only memory, programmable read only memory or electrically erasable programmable memory, register, and the like. The storage medium is located in the memory 840, and the processor 830 reads the information in the memory 840 and completes the contents of the above method in combination with its hardware. To avoid repetition, it will not be described in detail here.

In a specific implementation manner, the control module 620 included in the access network device in FIG. 6 can be implemented by the processor 830 of FIG. 8 and the communication module 610 included in the access network device 600 can be implemented by the input interface 810 and the output interface 820 of FIG. 8.

Figure 9:
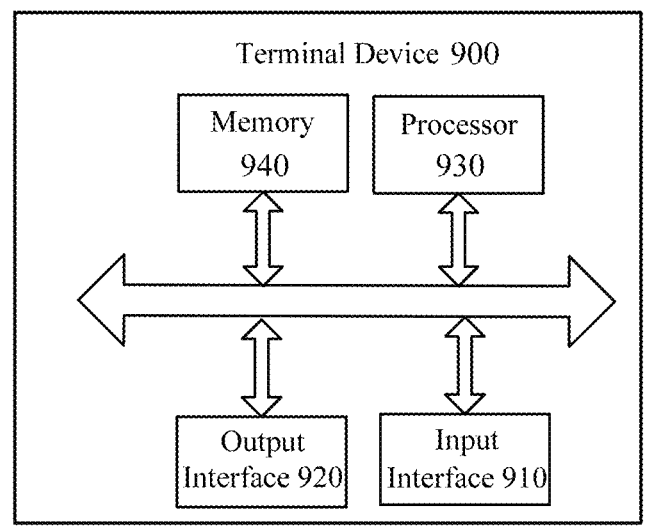
FIG. 9 is a schematic block diagram of a terminal device according to another embodiment of the present application.

As shown in FIG. 9, an embodiment of the present application further provides a terminal device 900, which may be the terminal device 700 in FIG. 7 and can be used to perform contents of the terminal device corresponding to the method 300, 400 or 500 in FIG. 3. The terminal device 800 includes: an input interface 910, an output interface 920, a processor 930 and a memory 940, all of which can be connected through a bus system. The memory 940 is configured to store programs, instructions or codes. The processor 930 is configured to execute the programs, instructions or codes in the memory 940 to control the input interface 910 to receive a signal, control the output interface 920 to transmit a signal, and complete the operations in the foregoing method embodiments.

It should be understood that in the embodiments of the present application, the processor 930 may be a central processing unit ("CPU"), and it may also be other general-purpose processors, digital signal processors (DSPs), application specific integrated circuits (ASICs), field programmable gate array (FPGAs) or other programmable logic devices, discrete gates or transistor logic devices, discrete hardware components, and the like. The general purpose processor may be a microprocessor or the processor may also be any conventional processor or the like.

The memory 940 can include read only memory and random access memory and it provides instructions and data to the processor 930. A portion of the memory 940 can also include a non-volatile random access memory. For example, the memory 940 can also store information on device type.

In the implementation process, contents of the above method may be completed by an integrated logic circuit of hardware in the processor 930 or an instruction in a form of software. The contents of the method disclosed in the embodiments of the present application may be directly implemented as performed by a hardware processor, or may be performed by a combination of hardware and software modules in the processor. The software module can be located in a conventional storage medium such as random access memory, flash memory, read only memory, programmable read only memory or electrically erasable programmable memory, register, and the like. The storage medium is located in the memory 940 and the processor 930 reads information in the memory 940 and completes the contents of the above method in combination with its hardware. To avoid repetition, it will not be described in detail here.

In a specific implementation manner, the determining module 710 included in the terminal device in FIG. 7 can be implemented by the processor 930 of FIG. 9 and the communication module 720 included in the terminal device 700 can be implemented by the input interface 910 and the output interface 920 of FIG. 9.

An embodiment of the present application further provides a computer readable storage medium which stores one or more programs including instructions which, when executed by a portable electronic device including a plurality of applications, cause the electronic device to perform the methods of the embodiments shown in FIGS. 2 to 5.

An embodiment of the present application also proposes a computer program including instructions which, when executed by a computer, to cause the computer to execute the corresponding procedures of the methods of the embodiments shown in FIGS. 2 to 5.

Those of ordinary skills in the art may be aware that the units and algorithm steps in individual examples described in combination with the embodiments described in the present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by those skilled in the art that for the purpose of convenient and brief description, for a detailed working process of the foregoing system, device and unit, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, each functional unit in each embodiment of the present application may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

What is claimed is:

1. A communication method, comprising:
    receiving, by a first primary access network device, a first message sent by a terminal device in a specific state when there is uplink data to be transmitted, wherein the first message is a radio resource control (RRC) message used for requesting for switching the terminal device from a first state to a second state, and the first message comprises link quality information of a secondary access network; and
    controlling, by the first primary access network device, a secondary connection between the terminal device and a secondary access network device according to the link quality information of the secondary access network in the first message;
    wherein said controlling the secondary connection between the terminal device and the secondary access network device comprises:
    in response to that the link quality information of the secondary access network in the first message indicates that the secondary access network is available or a link quality of the secondary access network meets a preset condition, controlling, by the first primary access network device, to restore the secondary connection between the terminal device and the secondary access network device; and
    in response to that the link quality information of the secondary access network in the first message indicates that the secondary access network is unavailable or the link quality of the secondary access network does not meet the preset condition, controlling, by the first primary access network device, to release the secondary connection between the terminal device and the secondary access network device.

2. The method according to claim 1, wherein the specific state is a suspend state or a non-activated state.

3. The method according to claim 1, wherein if a second primary access network device to which the terminal device is connected before the terminal device enters the specific state is the same as the first primary access network device, the method, before the receiving, by a first primary access network device, a first message sent by a terminal device in a specific state when there is uplink data to be transmitted, further comprises:
    suspending the secondary connection between the terminal device and the secondary access network device and transitioning the terminal device to the specific state by the first primary access network device.

4. The method according to claim 1, wherein the link quality information of the secondary access network is indicative of a link quality value of the secondary access network, the controlling, by the first primary access network device, the secondary connection between the terminal device and the secondary access network device according to the link quality information of the secondary access network comprises:
    controlling, by the first primary access network device, the secondary connection between the terminal device and the secondary access network device according to the link quality value of the secondary access network.

5. The method according to claim 4, wherein one of the following is performed:
    if the link quality value of the secondary access network is not less than a pre-configured link quality threshold, the controlling, by the first primary access network device, the secondary connection between the terminal device and the secondary access network device according to the link quality value of the secondary access network comprises: controlling, by the first primary access network device, to restore the secondary connection between the terminal device and the secondary access network device; and
    if the link quality value of the secondary access network is less than the pre-configured link quality threshold, the controlling, by the first primary access network device, the secondary connection between the terminal device and the secondary access network device according to the link quality value of the secondary access network comprises: controlling, by the first primary access network device, to release the secondary connection between the terminal device and the secondary access network device.

6. The method according to claim 5, wherein the controlling, by the first primary access network device, to restore the secondary connection between the terminal device and the secondary access network device comprises:
    sending, by the first primary access network device, to the secondary access network device, a second message used for requesting the secondary access network device to restore the secondary connection; and
    receiving, by the first primary access network device, a response message of the second message sent by the secondary access network device, used for indicating that the secondary access network device has restored the secondary connection.

7. The method according to claim 6, wherein the method, after the receiving, by the first primary access network device, the response message of the second message sent by the secondary access network device, further comprises:
sending, by the first primary access network device, to the terminal device, a third message used for notifying the terminal device to restore related configuration of the secondary connection.

8. The method according to claim 7, wherein the third message is an RRC message.

9. The method according to claim 5, wherein the controlling, by the first primary access network device, to release the secondary connection between the terminal device and the secondary access network device comprises:
sending, by the first primary access network device, to the secondary access network device, a fourth message used for requesting the secondary access network device to release the secondary connection; and
receiving, by the first primary access network device, a response message of the fourth message sent by the secondary access network device, used for indicating that the secondary access network device has released the secondary connection.

10. The method according to claim 9, wherein the method, after the receiving, by the first primary access network device, a response message of the fourth message sent by the secondary access network device, further comprises:
sending, by the first primary access network device, to the terminal device, a fifth message used for notifying the terminal device that the secondary access network device has released the secondary connection.

11. The method according to claim 10, wherein the fifth message comprises second indication information used for instructing the terminal device to release configuration information related to the secondary connection.

12. The method according to claim 1, wherein if a second primary access network device to which the terminal device is connected before the terminal device enters the specific state is different from the first primary access network device, the method further comprises:
obtaining, by the first primary access network device, configuration information of the secondary connection from the second primary access network device, the configuration information of the secondary connection being used by the first primary access network device to control the secondary connection according to the configuration information of the secondary connection.

13. The method according to claim 12, wherein the obtaining, by the first primary access network device, configuration information of the secondary connection from the second primary access network device comprises:
sending, by the first primary access network device, to the second primary access network device, a sixth message used for requesting for obtaining context information of the terminal device in the second primary access network; and
receiving, by the first primary access network device, a response message of the sixth message sent by the second primary access network device comprising the configuration information of the secondary connection.

14. An access network device, comprising:
a transceiver configured to receive a first message sent by a terminal device in a specific state when there is uplink data to be transmitted, wherein the first message is a radio resource control (RRC) message used for requesting for switching the terminal device from a first state to a second state, and the first message comprises link quality information of a secondary access network; and
a processor configured to control a secondary connection between the terminal device and a secondary access network device according to the link quality information of the secondary access network in the first message;
wherein the processor is further configured to:
in response to that the link quality information of the secondary access network in the first message indicates that the secondary access network is available or a link quality of the secondary access network meets a preset condition, control to restore the secondary connection between the terminal device and the secondary access network device; and
in response to that the link quality information of the secondary access network in the first message indicates that the secondary access network is unavailable or the link quality of the secondary access network does not meet the preset condition, control to release the secondary connection between the terminal device and the secondary access network device.

15. The access network device according to claim 14, wherein the specific state is a suspend state or a non-activated state.

16. The access network device according to claim 14, wherein if a second primary access network device to which the terminal device is connected before the terminal device enters the specific state is same as the access network device, before the transceiver receives the first message, the processor is further configured to:
suspend the secondary connection between the terminal device and the secondary access network device and transition the terminal device to the specific state.

17. A terminal device, comprising:
a processor configured to determine there is uplink data to be transmitted when the terminal device is in a specific state and configured to detect a link quality of a secondary access network; and
a transceiver configured to send, to a first primary access network device, a first message, wherein the first message is a radio resource control (RRC) message used for requesting for switching the terminal device from a first state to a second state, comprises link quality information of the secondary access network, and is used by the first primary access network device to control a secondary connection between the terminal device and a secondary access network device,
wherein the first primary access network device is configured to:
in response to that the link quality information of the secondary access network in the first message indicates that the secondary access network is available or a link quality of the secondary access network meets a preset condition, control to restore the secondary connection between the terminal device and the secondary access network device; and
in response to that the link quality information of the secondary access network in the first message indicates that the secondary access network is unavailable or the link quality of the secondary access network does not meet the preset condition, control to release the secondary connection between the terminal device and the secondary access network device.

18. The terminal device according to claim 17, wherein the specific state is a suspend state or a non-activated state.

19. The terminal device according to claim 17, wherein the transceiver is further configured to:
   receive a second message sent by the first primary access network device, used for notifying the terminal device to restore configuration information related to the secondary connection.

20. The terminal device according to claim 17, wherein the transceiver is further configured to:
   receive a third message sent by the first primary access network device, used for notifying the terminal device that the secondary access network device has released the secondary connection.

\* \* \* \* \*